Patented Nov. 17, 1942

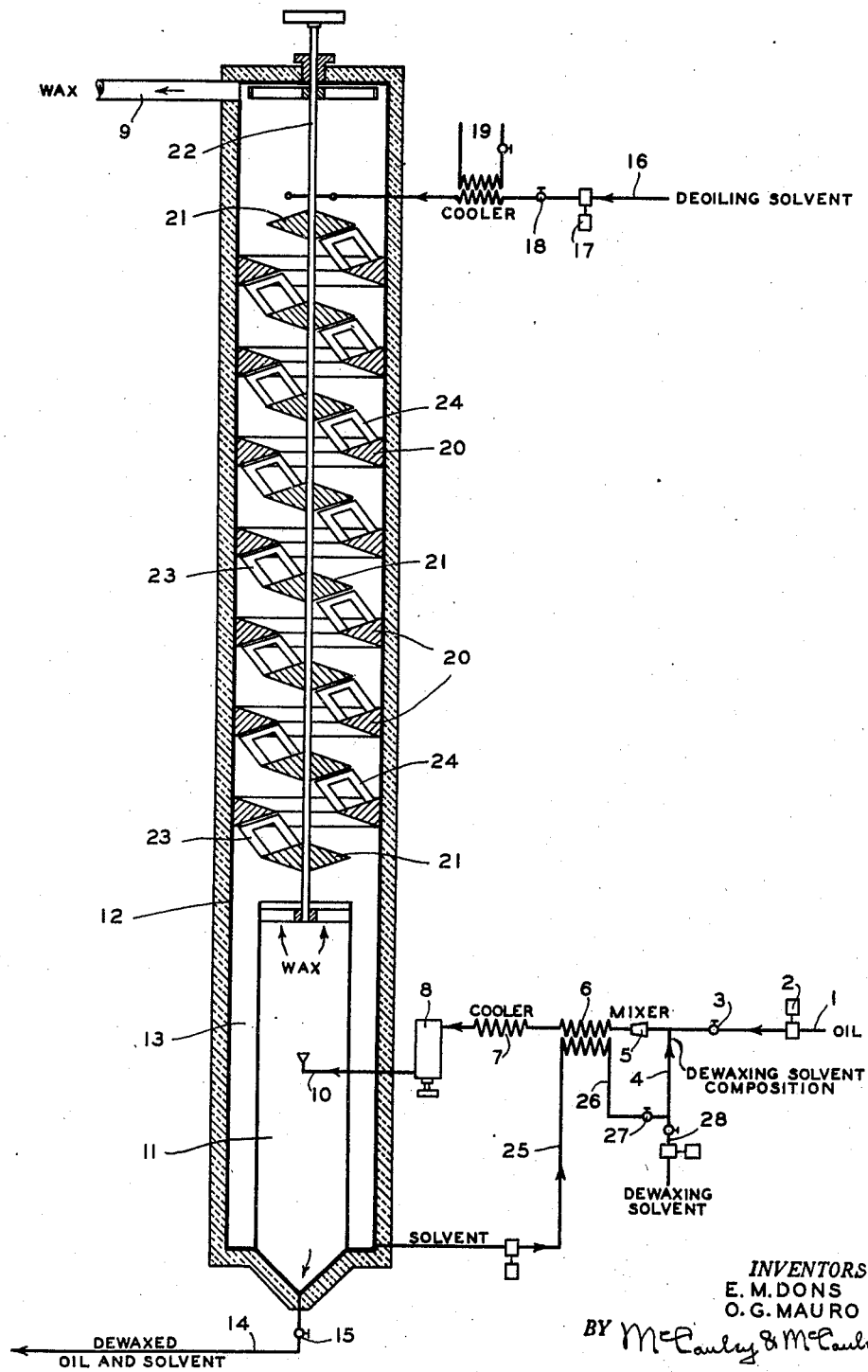

2,302,657

UNITED STATES PATENT OFFICE 2,302,657

PROCESS OF DEWAXING OILS AND
DEOILING THE WAX

Eddie M. Dons and Oswald G. Mauro, Tulsa, Okla., assignors to Mid-Continent Petroleum Corporation, Tulsa, Okla., a corporation of Delaware Application December 26, 1941, Serial No. 424,397

10 Claims. (Cl. 196—18)

This invention relates to processes of dewaxing the oil and deoiling the wax. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in separating constituents of slack wax, as well as in the treatment of other products to separate waxy materials.

One of the objects of the invention is to produce a highly efficient unitary process consisting of a few simple cooperative steps wherein the wax is very readily separated from the oil and then subjected to a forcible deoiling operation which removes minor portions of the oil carried by the wax.

To most effectively establish and maintain the new combination of conditions, the nature of the solvents requires consideration, not with the idea of producing filterable wax, but to provide for use of a selective dewaxing composition that will be most effective in dewaxing the oil, while using a substantially different selective oil solvent to deoil the wax. An object is to economically employ the different selective solvents while obtaining important advantages at successive stages of the process.

With the foregoing and other objects in view, the invention comprises a novel sequence of operations hereinafter more specifically described and shown in the accompanying drawing to illustrate one form of the invention. However, it is to be understood that the invention comprehends changes, variations and modifications within the scope of the claims hereunto appended.

The accompanying drawing is a diagrammatical view of a system which may be employed to carry out one form of the invention.

A continuous regulated stream of the wax-bearing charging stock, for example, a lubricating oil stock, enters the system through a pipe 1 which may be provided with a pump 2 and a regulating valve 3. A continuous stream of selective dewaxing solvent, from sources to be hereafter described, is conducted through a pipe 4 to the oil supply pipe 1. The continuous streams of oil and dewaxing solvent are united in the pipe 1 and transmitted through a mixing nozzle 5 where the oil and solvent are mixed at a temperature high enough to form the desired dewaxing solution.

The continuous stream of solution is transmitted through a heat exchanger 6 for preliminary cooling. Thereafter, the stream of solution passes through a cooler, or chiller, 7 where the flowing solution is cooled to a temperature desired for precipitation of wax in the liquid solution.

If desired, the resultant mixture of liquid solution and precipitated wax may be transmitted into a suitable wax-breaking device 8 whereby the wax is forcibly disintegrated into minute particles suspended in the chilled solution. Trapped oil solution is thus liberated from the precipitated wax particles, and the mixture of oil solution and disintegrated wax particles is in excellent condition for subsequent operations. A pipe 10 conducts a continuous stream of wax particles and solution into a settling chamber 11 surrounded by the lower portion of a separating chamber 12. This chamber 12 may be in the form of an upright column covered with insulation. Its lower portion may be separated from and concentric with the inner settling chamber 11, so as to form an annular settling chamber 13 around said inner chamber. In this form of the invention, the settling chambers 11 and 13 provide a pair of settling zones immediately below and in free communication with a cleansing zone hereafter described.

The incoming stream of chilled solution and wax particles may be delivered from the pipe 10 to the settling compartment 11 at approximately the temperature selected for precipitation of wax in the cooler, or chiller, 7. For example, this temperature may be about 0° F., and we prefer to insulate the column 12 so as to maintain the desired dewaxing and deoiling temperatures therein.

We are assuming that a relatively dense or heavy solvent has been selected for the dewaxing operation, and that the viscosity and interfacial tension are low enough to allow the wax particles to freely rise in the dense solution. In this event, the major portion of the dense solution will freely move downwardly to the bottom of the settling compartment 11 where it is discharged through a pipe 14, said pipe having a regulating valve 15 adjusted to regulate the flow therein. This outgoing solution is free of wax and it may be distilled in any suitable manner to remove the solvent from the dewaxed oil. It will be observed that most of the oil is very easily, quickly and economically dewaxed in the simple settling compartment 11, and immediately discharged from the dewaxing system.

Attention is now directed to the separating zone, or dewaxing zone established near the point where the incoming mixture of cooled solution and wax enters the settling compartment 11. The mass of wax particles moves upwardly and carries with it portions of the solution, including oily films around the wax particles and relatively free portions of the solution between the rising wax particles. However, this rising mass moves through the open top of the settling compartment 11 and passes through a relatively heavy descending stream which may be produced by continuously introducing a stream of deoiling solvent through a pipe 16 leading into the upper portion of the column 12. The pipe 16 is equipped with a pump 17 and a regulating valve 18 adjusted to regulate the flow of the incoming deoiling solvent, as well as a variable cooler 19 regulated to control the temperature of this solvent stream. This temperature is preferably substantially higher than the temperature of the solution discharged from the cooler 7 to the dewaxing zone 11. For example, if the dewaxing solution is chilled to a temperature of 0° F. in the cooler 7, the incoming deoiling solvent from the cooler 19 may be at a temperature of about 10° F. to about 15° F. By deliberately maintaining a temperature differential of this kind, the deoiling solvent will effectively deoil the wax.

The nature of this deoiling solvent is an important factor. It is a selective oil solvent having a high solvent power for oil and it differs from the selective dewaxing solvent composition which enters into the incoming oil. We preferably employ a suitable oil solvent having a low viscosity and lacking the wax-rejecting properties of the dewaxing solvents. Such solvents should be substantially lighter than the wax, or substantially heavier than the wax, so as to provide for comparatively rapid movements of the wax and solution in the settling and counterflow zones. If a relatively heavy solvent is desired, good examples of a suitable selective deoiling solvent will be found in methylene dichloride alone, or combined with a small percentage of a dense wax-rejecting solvent, such as dichlorethyl ether or sulfur dioxide. The wax-rejecting solvent may be about 10 per cent of the selective deoiling solvent composition.

When a heavy deoiling solvent is employed, the stream of deoiling solvent from the cooler 19 will descend in direct contact with the rising stream of wax particles, so as to selectively dissolve the free portions of oil solution carried by the wax, and also forcibly scrub the oily films from the rising wax particles. This action may be aided by any suitable mechanical appliances. For example, the upper portion of the column 12 may be provided with alternating baffles including a series of rings 20 extending inwardly from the inner face of the column 12 and a series of central baffle members 21 arranged as shown in the drawing to produce an elongated tortuous passageway wherein the rising wax particles move back and forth in a zigzag course. The stream of selective deoiling solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined bottom faces of the baffles, and that said wax particles repeatedly intersect the descending solvent while rising from one upwardly inclined plane to another. The deoiled wax may be discharged through a pipe 9 above the inlet for the deoiling solvent.

The inclined faces of the baffles tend to prevent the wax particles from clinging to said baffles. However, any suitable mechanical means may be employed to prevent or limit the growing of wax crystals which might otherwise extend from the bottom faces of the baffles. For example, the central baffles 21 may be fixed to a slowly rotating shaft 22 so as to rotate with the shaft, and scrapers 23 may extend from the top faces of these rotary baffles to remove waxy material from the bottoms of the stationary baffle rings 20. These stationary baffles may be likewise provided with scrapers 24 extending from their top faces to remove waxy material from the bottom faces of the rotating baffles. In each case, the scrapers extend from the top of one baffle to a point adjacent to the bottom of the next higher baffle. It is not necessary to forcibly scrape the baffles, the object being to limit the thickness of any wax deposit tending to grow on the baffles.

An interesting condition appears in the effective cleansing of the rising wax particles due to the forcible scrubbing and dissolving action of the selective deoiling solvent which repeatedly crosses the path of the wax in the deoiling zone. Attention is also directed to the condition at the lower portion of this deoiling zone where the descending solvent stream is diverted from the top of the settling chamber 11. This deflection of the descending solvent is due partly to the upward force of the rising stream of wax particles issuing from the top of said chamber 11, and partly to the descending current in the outer settling compartment 13. The lowermost central baffle 21 also tends to deflect the descending solvent toward the outer compartment 13. Some of the wax particles may be swept into the settling compartment 13, but these wax particles are so light that they will eventually rise in the heavy solvent and return to the mass of wax, instead of passing to the bottom of said settling compartment 13.

The selective deoiling solvent performs a very important function in selectively removing oil carried by the wax particles. However, most of the oil is removed from the wax in said initial settling chamber 11, so the deoiling solvent stream which descends through the settling chamber 13 contains only a small percentage of the oil. Therefore, this reasonably fresh body of selective oil solvent can be very conveniently modified for use in the dewaxing stage of the process. For example, it may be continuously transmitted from the bottom of the settling chamber 13 through a pipe 25 to the heat exchanger 6, and thence through pipe 26 and regulating valve 27 to the pipe 4 leading to the continuous incoming stream of wax-bearing oil in the pipe 1. A regulated quantity of the modifying solvent may be pumped through a pipe 28 to the pipe 4, so as to maintain a constant delivery of the selective dewaxing solvent composition to the incoming stream of oil.

At this point it may be observed that a substantial advantage is gained at an initial stage in the settling chamber 11, where a free counterflow of wax and oil solution immediately removes most of the oil from the wax. This desirable quiescent settling in the chamber 11 is not disturbed by the deoiling solvent composition descending from the higher deoiling zone. Since the descending solvent is diverted into the settling chamber 13 it does not mix with the outgoing dewaxed solution in the pipe 14, and it permits free return of wax particles that may be carried into said settling chamber 13.

The velocity and time of the deoiling action may be regulated to dissolve practically all of the oil carried by the wax, or any desired percentage of oil may be discharged with the wax, depending upon the commercial requirements.

It is to be understood that the invention is not limited to the specific arrangements of chambers and zones herein disclosed to illustrate one form of the invention, and that any suitable light or heavy solvents may be employed to produce the counterflow of wax and solvent. However, as an illustration of heavy solvent compositions selected for this invention we have referred to a desirable selective deoiling solvent composed of methylene dichloride alone or combined with a small percentage of wax-rejecting solvent. More specifically stated, the incoming deoiling solvent from pipe 16 may consist of about 90 per cent methylene dichloride and about 10 per cent dichlorethyl ether or sulfur dioxide. Continuing this specific illustration we find that the used deoiling solvent and the oil dissolved thereby may be discharged through pipes 25, 26 and 4, to the incoming stream of oil. To produce a desirable selective dewaxing solvent composition, a regulated quantity of dewaxing solvent may be delivered from the supply pipe 28 to the pipe 4. This added dewaxing solvent is preferably a wax-rejecting solvent, and if methylene dichloride has been selected as the deoiling solvent, the added wax-rejecting solvent from pipe 28 may be dichlorethyl ether or sulfur dioxide in regulated quantities sufficient to produce a dewaxing solvent comprising about 75 per cent methylene dichloride and about 25 per cent wax-rejecting solvent. The ratio of dewaxing solvent may be about two to four times the volume of oil. However, all of these conditions are subject to variations depending upon the charging stock and the results desired. We preferably employ a highly efficient oil solvent in the counterflow deoiling zone, and the deoiling efficiency can be increased by maintaining the deoiling zone at a relatively high temperature. These highly efficient conditions may occasionally result in unintentional melting of some of the wax.

However, if the used deoiling solvent is employed in forming the dewaxing solvent, any dissolved wax will be carried into the incoming charging stock, and thereby recovered in the system. Another advantage of this feature appears in the convenient recovery of valuable oil which is constantly carried by the selective deoiling solvent flowing from the deoiling zone to the incoming charging stock.

We claim:

1. In the art of dewaxing oils and deoiling the wax, the process which comprises maintaining a settling zone in communication with a counterflow deoiling zone, while dewaxing the oil in said settling zone and deoiling the wax in said counterflow deoiling zone, said process including the steps of dissolving a stream of the wax-containing oil in a selective dewaxing solvent composition, cooling the resultant solution to precipitate relatively light wax in the liquid solution, transmitting a mixture of the liquid solution and lighter wax particles into said settling zone, causing relatively heavy dewaxed solution to drop by gravity from the wax particles in said settling zone, discharging said dewaxed solution from a lower portion of said settling zone, while causing said wax particles to rise from the dewaxed solution in said settling zone, transmitting said wax particles through said counterflow deoiling zone, causing the wax particles to rise in said counterflow deoiling zone, while transmitting a descending stream of relatively heavy selective deoiling solvent through the mass of rising wax particles, thereby subjecting a rising stream of the wax particles to a selective deoiling operation in said counterflow deoiling zone, discharging a stream of used deoiling solvent composition from said rising stream of wax particles in said counterflow deoiling zone separately from the discharge of dewaxed solution from the lower portion of said settling zone, introducing a continuous stream of said selective oil solvent into said counterflow deoiling zone to produce and maintain said descending stream of selective deoiling solvent, and continually introducing selective dewaxing solvents, including the separately discharged used deoiling solvent composition and a substantial percentage of wax-rejecting solvent, into said stream of wax-containing oil, so as to produce and maintain said selective dewaxing solvent composition, the wax-rejecting properties of said dewaxing solvent composition being substantially greater than that of the selective deoiling solvent.

2. In the art of dewaxing oils and deoiling the wax, the process which comprises maintaining a settling zone in communication with a counterflow deoiling zone, while dewaxing the oil in said settling zone and deoiling the wax in said counterflow deoiling zone, said process including the steps of dissolving the oil in a selective dewaxing solvent, precipitating wax in a liquid solution of said oil and selective dewaxing solvent, transmitting a mixture of the liquid oil solution and wax particles into said settling zone, causing oil solution to separate from the wax particles in said settling zone, discharging said dewaxed solution from said settling zone, while transmitting a continuous stream of the wax particles with portions of oil solution into said counterflow deoiling zone, causing the stream of wax particles to flow through said counterflow deoiling zone, while transmitting a counterflowing stream of selective oil solvent through the stream of wax particles, thereby subjecting the stream of wax particles to a selective deoiling operation in said counterflow deoiling zone, continuously discharging a stream of used selective deoiling composition from the stream of wax particles in said counterflow deoiling zone separately from the discharge of dewaxed solution from said settling zone, and mixing said separately discharged used deoiling composition with a regulated quantity of wax-rejecting solvent to produce said selective dewaxing solvent.

3. In the art of dewaxing oils and deoiling the wax, the process which comprises maintaining a settling zone in communication with a counterflow deoiling zone, while dewaxing the oil in said settling zone and deoiling the wax in said counterflow zone, said process including the steps of dissolving the oil in a selective dewaxing solvent, precipitating wax in a relatively heavy solution of said oil and selective dewaxing solvent, transmitting a mixture of the relatively heavy liquid solution and lighter wax particles into said settling zone, causing relatively heavy dewaxed solution to drop by gravity from the wax particles in said settling zone, discharging said dewaxed solution from a lower portion of said settling zone, while causing a stream of said wax particles to rise from the dewaxed solution in said settling zone, transmitting said wax particles through said counterflow deoiling zone, causing the wax particles to rise in said counterflow deoiling zone, while transmitting a descending stream of relatively heavy selective deoiling solvent through the mass of rising wax particles, thereby subjecting a rising stream of the wax particles to a selective deoiling operation in said counterflow deoiling zone, discharging a stream of used selective deoiling composition from said stream of wax particles in said counterflow deoiling zone separately from the discharge of dewaxed solution from the lower portion of the settling zone, and mixing said separately discharged used selective deoiling composition with a regulated quantity of dewaxing solvent material to produce said selective dewaxing solvent.

4. A process as set forth in claim 1 including methylene dichloride in the relatively heavy selective deoiling solvent.

5. A process as set forth in claim 1 including dichlorethyl ether in the relatively heavy dewaxing solvent.

6. A process as set forth in claim 1 including sulfur dioxide in the relatively heavy dewaxing solvent.

7. A process as set forth in claim 1 including methylene dichloride in both of the relatively selective solvents, and an added portion of wax-rejecting solvent in the selective dewaxing solvent composition.

8. A process as set forth in claim 3 including methylene dichloride in the selective deoiling solvent, and dichlorethyl ether added to the used selective deoiling composition to provide wax-rejecting properties in the selective dewaxing solvent.

9. A process as set forth in claim 3 wherein the used deoiling composition is mixed with sulfur dioxide to provide wax-rejecting properties in the selective dewaxing solvent.

10. A process as set forth in claim 3, wherein temperatures of the selective deoiling solvent in the counterflow deoiling zone are substantially higher than the temperature of the liquid solution entering the settling zone.

EDDIE M. DONS.
OSWALD G. MAURO.